United States Patent
Cowan et al.

(10) Patent No.: US 7,631,481 B2
(45) Date of Patent: Dec. 15, 2009

(54) COOLED DUCT FOR GAS TURBINE ENGINE

(75) Inventors: Curtis C Cowan, East Hampton, CT (US); Jorge I. Farah, Glastonbury, CT (US); Debora F. Kehret, Manchester, CT (US); Stanley Keysa, Windsor, CT (US); Jeffrey R. Lavin, Bloomfield, CT (US); Michael Murphy, Vernon, CT (US); Stephen A. Paul, Andover, CT (US); Richard Scott, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 465 days.

(21) Appl. No.: 11/000,829

(22) Filed: Dec. 1, 2004

(65) Prior Publication Data

US 2006/0112676 A1 Jun. 1, 2006

(51) Int. Cl.
*F02C 7/08* (2006.01)

(52) U.S. Cl. .............................. 60/39.5; 60/770; 60/266

(58) Field of Classification Search .................. 60/770, 60/266, 39.5, 771, 799, 766, 725, 761; 239/265.33, 239/265.37, 265.43; 181/213, 220
See application file for complete search history.

(56) References Cited

U.S. PATENT DOCUMENTS

| | | | | |
|---|---|---|---|---|
| 2,874,536 A * | 2/1959 | Benson et al. | ................ | 60/766 |
| 3,043,103 A * | 7/1962 | Dent et al. | ............... | 239/127.1 |
| 3,053,283 A * | 9/1962 | Allen et al. | .................. | 138/111 |
| 3,437,173 A * | 4/1969 | Ehrich | ........................ | 181/213 |
| 3,441,220 A | 4/1969 | Wildner | | |
| 3,850,261 A * | 11/1974 | Hehmann et al. | ........... | 181/286 |
| 3,972,475 A * | 8/1976 | Nelson et al. | ............. | 239/127.3 |
| 3,981,448 A * | 9/1976 | Demogenes et al. | ...... | 239/127.3 |
| 4,433,751 A * | 2/1984 | Bonneau | ..................... | 181/213 |
| 4,718,230 A * | 1/1988 | Honeycutt et al. | ............ | 60/766 |
| 4,801,087 A * | 1/1989 | Woodard | ................. | 239/127.1 |
| 4,864,818 A * | 9/1989 | Taylor | ......................... | 60/766 |
| 4,887,663 A * | 12/1989 | Auxier et al. | ................. | 165/47 |
| 4,944,362 A * | 7/1990 | Motsinger et al. | ........... | 181/213 |
| 5,076,496 A * | 12/1991 | Lippmeier | ............. | 239/265.41 |
| 5,201,887 A * | 4/1993 | Bruchez et al. | ............... | 60/766 |
| 5,221,048 A * | 6/1993 | Lair | ....................... | 239/265.37 |
| 5,363,645 A * | 11/1994 | Pellet | ........................... | 60/267 |
| 5,388,765 A * | 2/1995 | Hill et al. | .................. | 239/127.3 |
| 5,485,959 A * | 1/1996 | Wood et al. | ............. | 239/265.41 |
| 5,557,932 A | 9/1996 | Nash | | |
| 5,655,361 A * | 8/1997 | Kishi | ........................... | 60/266 |
| 5,839,663 A * | 11/1998 | Broadway et al. | ...... | 239/265.35 |
| 6,041,590 A | 3/2000 | Hayton et al. | | |
| 6,199,371 B1 | 3/2001 | Brewer et al. | | |

(Continued)

*Primary Examiner*—William H Rodriguez

(57) ABSTRACT

A cooled exhaust duct for use in gas turbine engines is provided. The cooled exhaust duct includes an axial centerline, a circumference, an annulus, and a plurality of radially expandable bands. The annulus is disposed between a first wall and a second wall, and extends along the axial centerline. The first wall is disposed radially inside of the second wall. Each of the plurality of radially expandable bands extends circumferentially within the annulus. The bands are axially spaced apart from one another. Each band includes a first portion attached to the first wall, a second portion attached to the second wall and an intermediate portion connected to the first and second portions. The bands create circumferentially extending compartments that inhibit axial travel of the cooling air within the annulus.

12 Claims, 3 Drawing Sheets

U.S. PATENT DOCUMENTS

| | | | |
|---|---|---|---|
| 6,415,599 B1 * | 7/2002 | Ausdenmoore et al. | 60/230 |
| 6,935,834 B2 * | 8/2005 | Lata Perez | 415/115 |
| 7,188,417 B2 * | 3/2007 | Weeks | 29/890.01 |
| 7,430,867 B2 * | 10/2008 | Agg | 60/770 |
| 2006/0137352 A1 * | 6/2006 | Prasad et al. | 60/761 |
| 2006/0179816 A1 * | 8/2006 | Murphy et al. | 60/39.5 |
| 2007/0151229 A1 * | 7/2007 | Farah et al. | 60/232 |

* cited by examiner

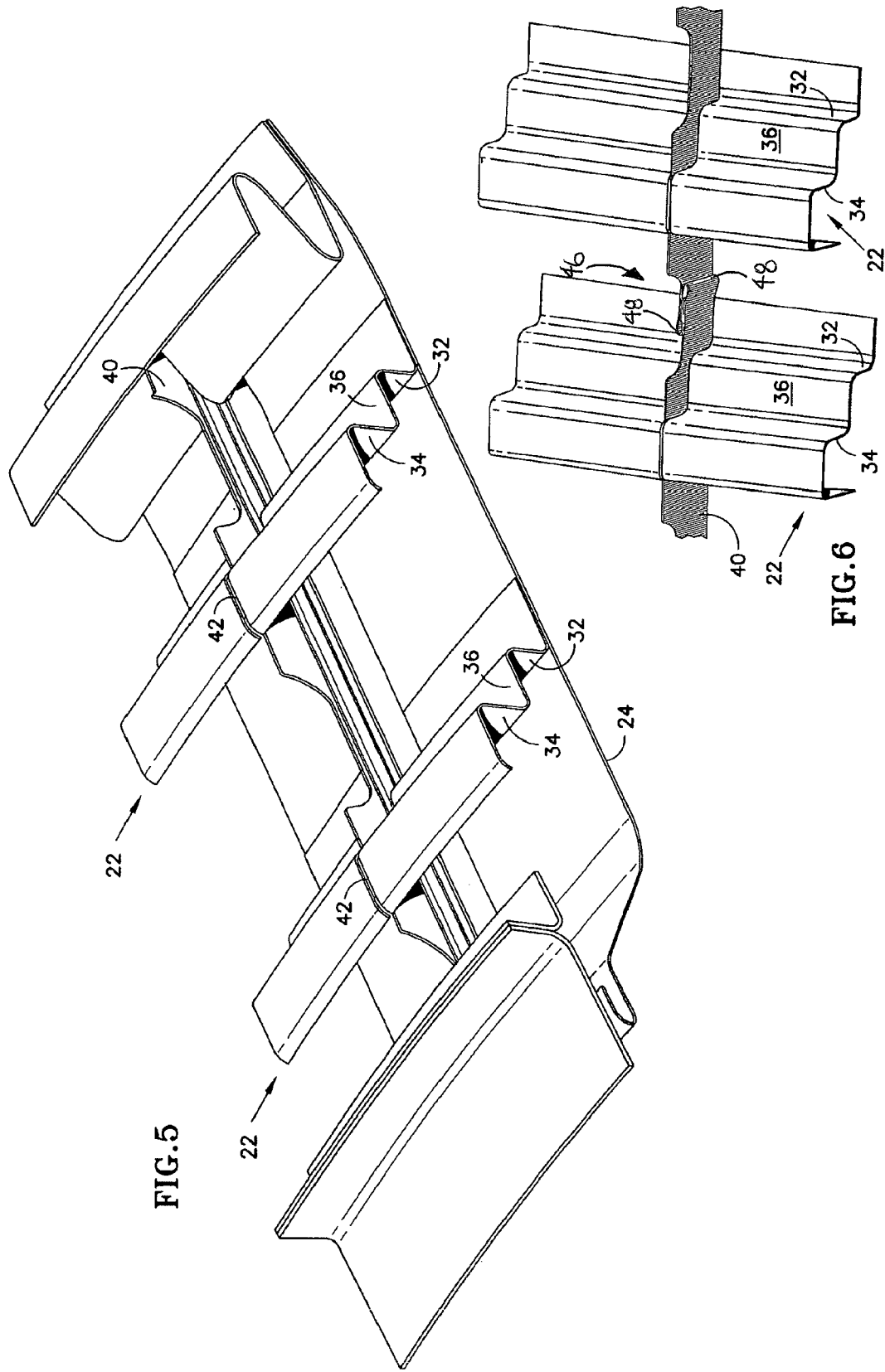

COOLED DUCT FOR GAS TURBINE ENGINE

This invention was made with Government support under N00019-02-C-3003 awarded by the United States Navy. The Government has certain rights in this invention.

BACKGROUND OF THE INVENTION

1. Technical Field

This invention applies to ducts having utility in gas turbine engines in general, and to cooled ducts in particular.

2. Background Information

Efficiency is a primary concern in the design of any gas turbine engine. Historically, one of the principle techniques for increasing efficiency has been to increase the gas path temperatures within the engine. The increased temperatures necessitate internally cooled components, high-temperature capacity materials, etc. A duct passage downstream (or "aft") of the turbine is typically cooled using compressor air worked to a higher pressure, but still at a lower temperature than that of the core gas flow passing through the duct passage. The higher pressure provides the energy necessary to push the air through the walls of the duct. A significant percentage of the work imparted to the air bled from the compressor, however, is lost during the cooling process. The lost work does not add to the thrust of the engine and therefore negatively affects the overall efficiency of the engine. A person of skill in the art will recognize, therefore, that there is a tension between the efficiency gained from higher core gas path temperatures and the concomitant need to cool components and the efficiency lost from bleeding air to perform that cooling. There is, accordingly, great value in minimizing the amount of cooling air required to cool the duct passage.

To provide an acceptable amount of cooling air, it is necessary to maintain the cooling air at a predetermined pressure greater than that of the core gas flow disposed within the duct passage. The pressure difference between the core gas flow and the cooling air is typically referred to as the "backflow margin". Core gas flow within the duct passage is seldom uniform in temperature or pressure; e.g., core gas flow within certain circumferential sections of the duct passage may typically be at a higher pressure than flow within adjacent sections. The backflow margin for prior duct passages must typically be relatively large to ensure that adequate cooling is present around the circumference of the duct passage, and undesirable hot core gas inflow is avoided. What is needed, therefore, is a duct passage that promotes desirable, efficient cooling.

DISCLOSURE OF THE INVENTION

According to the present invention, a cooled exhaust duct for use in gas turbine engines is provided. The cooled exhaust duct includes an axial centerline, a circumference, an annulus, and a plurality of radially expandable bands. The annulus is disposed between a first wall and a second wall, and extends along the axial centerline. The first wall is disposed radially inside of the second wall. Each of the plurality of radially expandable bands extends circumferentially within the annulus. The bands are axially spaced apart from one another. Each band includes a first portion attached to the first wall, a second portion attached to the second wall and an intermediate portion connected to the first and second portions. The bands create circumferentially extending compartments that inhibit axial travel of the cooling air within the annulus.

In some embodiments, the cooled exhaust duct further includes a plurality of baffles extending between adjacent bands. The baffles compartmentalize the circumferentially extending compartment, in which they are disposed, into a plurality of sub-compartments that inhibit circumferential travel of cooling air flow.

An advantage of the present invention is that it helps to prevent undesirable cooling airflow within the annulus. In some applications, the cooled exhaust duct will have regions of core gas flow within the duct that will be substantially higher (or lower) in pressure than the average core gas pressure. Without the present invention, the cooling air within the annulus would be driven toward the regions where the greatest pressure difference exists. As a result, the uniformity of the heat transfer associated with the cooling air is negatively affected. The compartmentalization provided by the present invention improves the uniformity of the cooling airflow.

Another advantage of the present invention is that it allows for thermal expansion and contraction of the annulus. The configuration of the bands accommodates radial and axial positional changes of the first wall and second wall. The attachment of the bands to the first and second walls permits relative positional changes of the first and second walls, while at the same time providing desirable sealing between compartments.

Another advantage of the present invention is that it can be used in a duct having multiple segments that rotate relative to one another.

Another advantage of the present invention is that the linear baffles provide additional acoustic capability.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 5 is a diagrammatic perspective view of a cooled exhaust duct segment with a wall removed.

FIG. 6 is a diagrammatic partial perspective of a cooled exhaust duct segment, including an embodiment of a baffle joint.

DETAILED DESCRIPTION OF THE INVENTION

Figure 1:
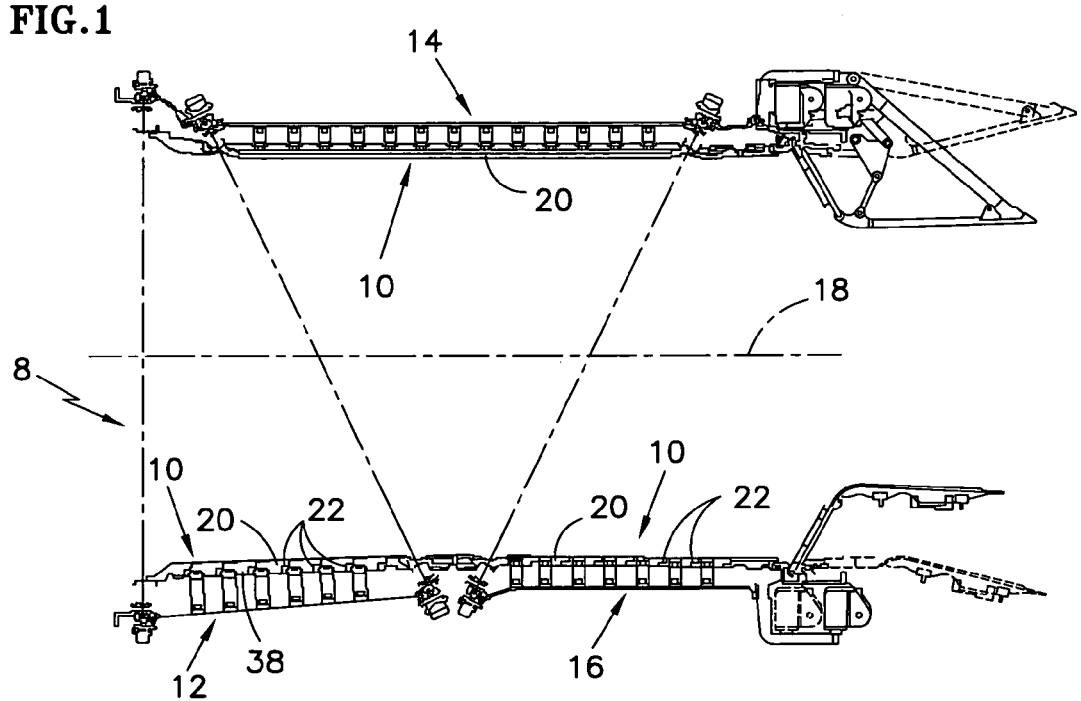
FIG. 1 is a diagrammatic view of a vectoring turbine exhaust nozzle that includes a cooled exhaust duct shown in a straight configuration.
Figure 2:
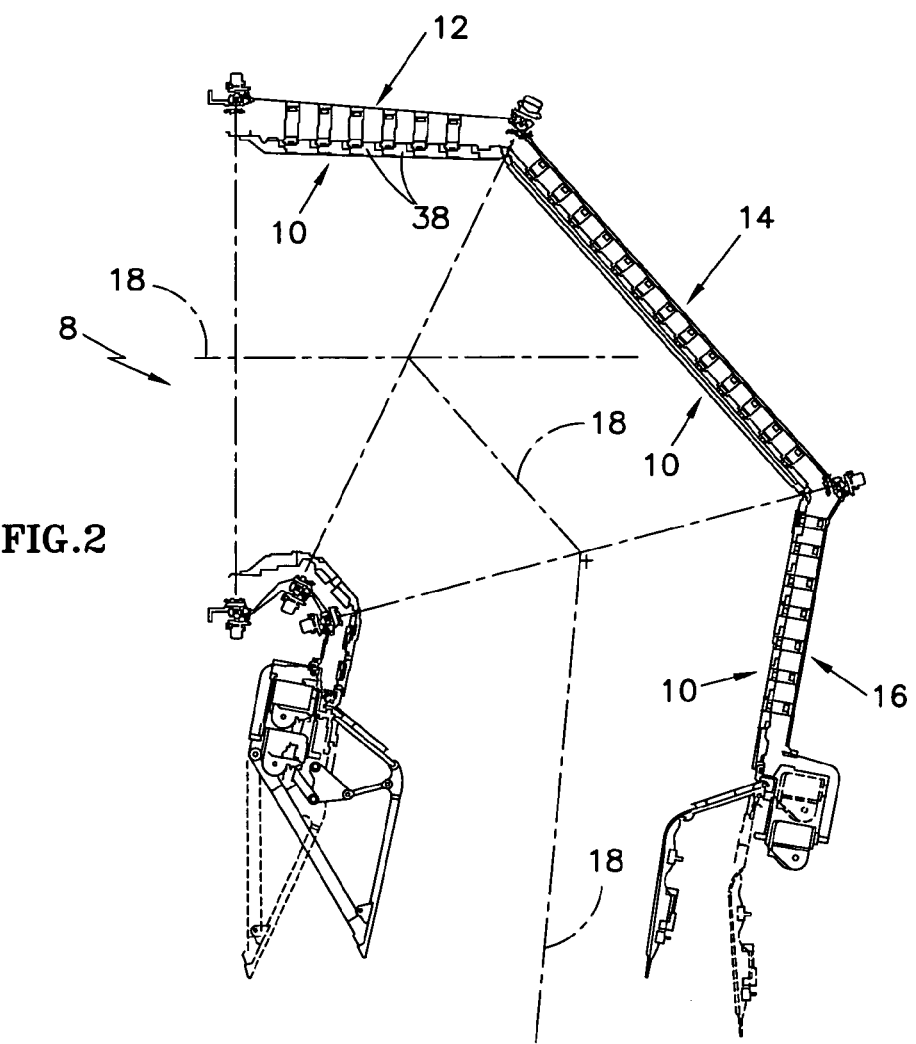
FIG. 2 is a diagrammatic view of a vectoring turbine exhaust nozzle that includes a cooled exhaust duct shown in an angled configuration.

Referring to FIGS. 1 and 2, an embodiment of a cooled exhaust duct 10 is shown employed within a vectoring turbine exhaust nozzle 8. The nozzle 8 includes a forward section 12, an intermediate section 14 and an aft section 16. In a first configuration shown in FIG. 1, the nozzle sections 12, 14, 16 are disposed in a manner such that the turbine exhaust nozzle 8 is substantially linear. In a second configuration shown in FIG. 2, the forward and aft sections 12, 16 are rotated approximately one hundred and eighty degrees (180°) relative to the intermediate section 14. As a result, the turbine exhaust nozzle turns approximately ninety degrees (90°).

Referring to FIGS. 1-4, the cooled exhaust duct 10 includes a centerline 18, a circumference, an annulus 20, and a plurality of radially expandable bands 22. In a non-circular configuration, the duct 10 would not, strictly speaking, have a circumference. The annulus 20 is disposed between a first wall 24 and a second wall 26, and extends along the axial centerline 18. The first wall 24 is disposed radially inside of the second wall 26. In a non-circular configuration, the "annulus" would be the interior region between the first wall 24 and the second wall 26. The first wall 24 and the second wall 26 each include a plurality of apertures 28, 30 for the passage of cooling air into and out of the annulus 20.

Figure 3:
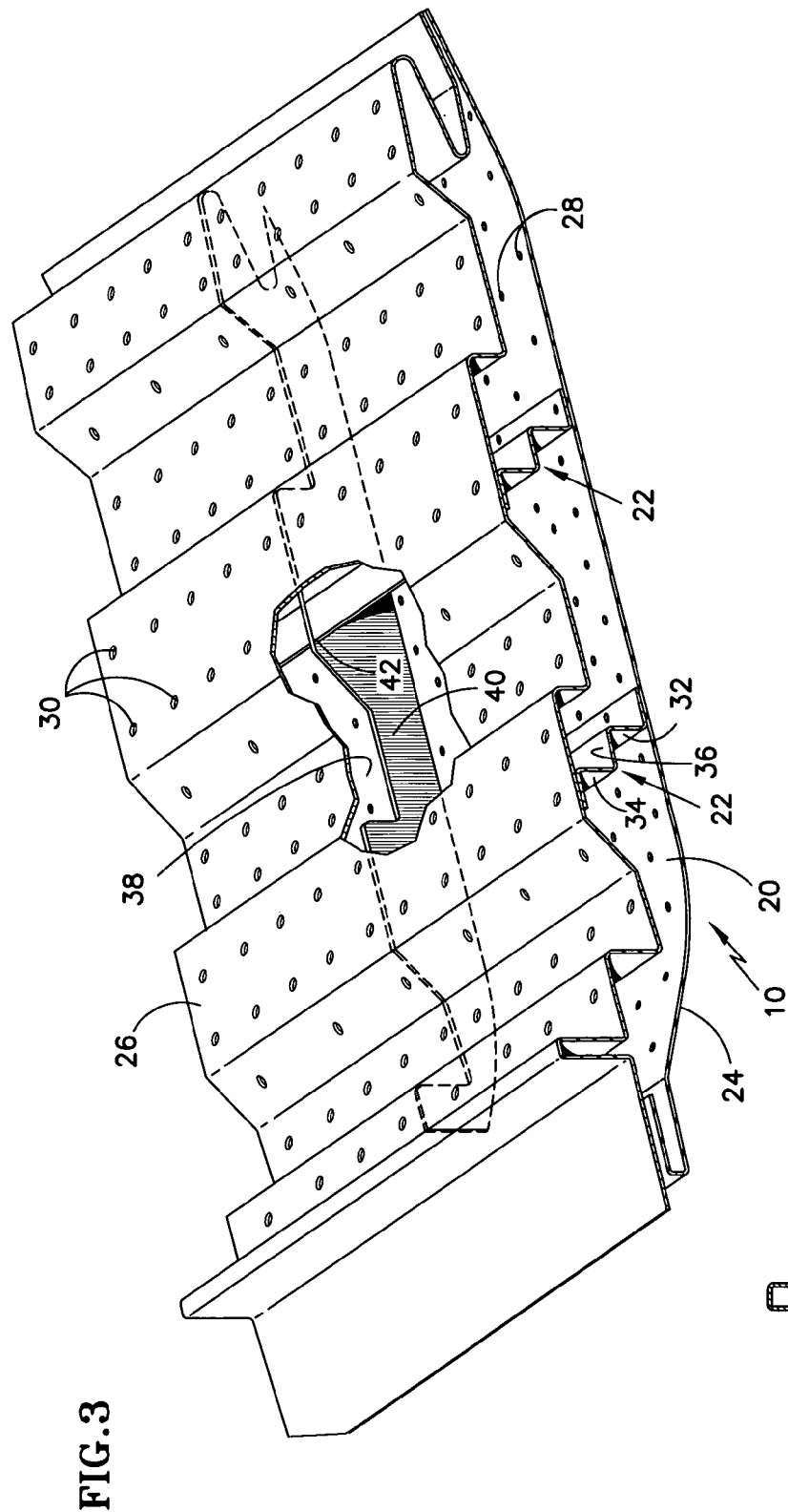
FIG. 3 is a diagrammatic perspective view of a cooled exhaust duct segment, partially broken to show a baffle.
Figure 4:
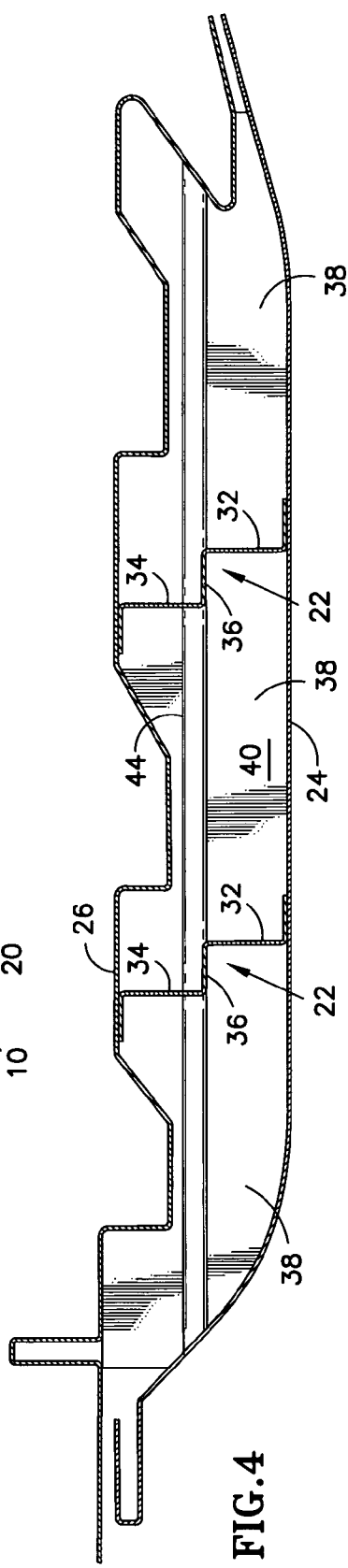
FIG. 4 is a diagrammatic end view of a cooled exhaust duct segment.

Now referring to FIGS. 3-5, each of the plurality of radially expandable bands 22 extends circumferentially within the annulus 20. The bands 22 are axially spaced apart from one another. The bands 22 are configured to accommodate movement between the first wall 24 and the second wall 26. In some instances, for example, the first wall 24 may experience significantly higher heat transfer than the second wall 26. In such an instance, the first wall 24 may thermally expand in a radial direction an amount greater than that of the second wall 26. The radially expandable bands 22 accommodate the change in relative radial position of the first and second walls 24, 26. In a preferred configuration, each band includes a first portion 32 attached to the first wall 24, a second portion 34 attached to the second wall 26 and an intermediate portion 36 connected to the first and second portions 32, 34. The intermediate portion 36 is substantially disposed along a plane that intersects the plane of the first portion 32 and the plane of the second portion 34. For example, the configuration may assume a "Z" shape, or the intermediate portion 36 may be substantially perpendicular to one or both of the first and second portions 32, 34, or the like (e.g., the intermediate portion 36 may extend in a direction approximately parallel to the axial centerline 18). The preferred configuration accommodates radial and axial relative movement of the walls 24, 26.

The bands 22 form circumferentially extending compartments 38 that inhibit axial cooling air travel within the annulus 20. The circumferentially extending compartments 38 may extend around all or a portion of the circumference of the duct 10. In the embodiment shown in FIGS. 1 and 2, the circumferentially extending compartments 38 within the forward, intermediate and aft nozzle sections 12, 14, 16 extend around a portion of the circumference of the duct 10. The circumferentially extending compartments 38 formed by the bands 22 enable the cooling within the duct 10 to be customized on a compartment-by-compartment basis. If a particular circumferential compartment 38 requires greater heat transfer than another compartment, then the cooling characteristics of that compartment 38 can be customized by changing the number and the size of cooling apertures 28, 30 that permit cooling air to enter and exit that circumferential compartment.

Referring to FIGS. 3-6, in some embodiments, the annulus 20 is further compartmentalized using baffles 40 that extend between adjacent bands 22. The baffles 40 extend heightwise between the first and second walls 24, 26, and lengthwise between adjacent bands 22. In some embodiments, each baffle 40 is attached to one of the first or second wall 24, 26. In the embodiment shown in FIGS. 3 and 5, the baffles 40 extend lengthwise across a plurality of bands 22, nested within slots 42 disposed in the bands 22. In this embodiment, the bands 22 and the baffles 40 are substantially orthogonally arranged. Movement of the baffles 40 is substantially prevented by the bands 22. In some instances, a baffle 40 may include a lengthwise extending feature 44 (e.g., rib, corrugation, etc.) that increases the lengthwise stiffness of the baffle 40. (See FIG. 4).

Referring to FIG. 6, in some embodiments the baffles 40 include one or more joints 46 that connect adjacent baffle segments. In the embodiment shown in FIG. 6, each baffle 40 segment includes a U-shaped portion 48, that receives the other U-shaped portion 48 to form the joint 46. The baffle joints 46 are not limited to this embodiment.

The compartments formed by the bands 22 and the baffles 40 enable the cooling within the duct 10 to be further customized on a compartment-by-compartment basis. If a particular circumferential compartment requires greater heat transfer at a particular circumferential position, than another compartment, then the cooling characteristics of that compartment can be customized by changing the number and the size of cooling apertures 28, 30 that permit cooling air to enter and exit that circumferential compartment.

In the operation of the invention, cooling air is disposed radially outside of the second wall 26 and hot core gas flow is disposed radially inside of the first wall 24. The cooling air is at a temperature lower and a pressure higher than the core gas flow. The pressure difference between the cooling air and the core gas flow causes the cooling air to enter the annulus 20 through apertures 30 disposed within the second wall 26, and exit the annulus 20 through the apertures 28 disposed within the first wall 24.

The cooling air entering the annulus 20 enters into one of the circumferentially extending compartments 38 formed by the bands 22. In those embodiments that utilize a plurality of baffles 40 extending between bands 22, the cooling air will enter into the compartments formed by the bands 22 and the baffles 40. The bands 22 and baffles 40 substantially impede compartment-to-compartment flow of cooling air within the annulus 20. Consequently, predominantly all of the cooling air entering a particular compartment 38, exits that compartment through the apertures 28 disposed within the first wall 24. As stated above, the characteristics of cooling airflow within a compartment 38 can be customized by varying the number and size of the apertures 28, 30 within the first and second walls 24, 26 of the compartment.

Although this invention has been shown and described with respect to the detailed embodiments thereof, it will be understood by those skilled in the art that various changes in form and detail thereof may be made without departing from the spirit and the scope of the invention.

What is claimed is:

1. A cooled exhaust duct having an axial centerline and a circumference, comprising:
   an annulus disposed between a first wall and a second wall, the annulus extending along the axial centerline, wherein the first wall is disposed radially inside of the second wall; and
   a plurality of radially expandable bands, each circumferentially extending within the annulus and axially spaced apart from one another, wherein the bands at first portions thereof, are attached to the first wall and at second portions thereof, are attached to the second wall and include intermediate portions connected to said first and second portions, said intermediate portions accommodating relative radial position change between the first wall and second wall due to differential thermal expansion of said first and second walls.

2. The cooled exhaust duct of claim 1, wherein the intermediate portion extends approximately parallel to the axial centerline.

3. The cooled exhaust duct of claim 1, further comprising a plurality of baffles extending lengthwise between adjacent radially expandable bands and heightwise between the first wall and the second wall.

4. The cooled exhaust duct of claim 3, wherein the radially expandable bands include slots, and the baffles are disposed within the slots.

5. The cooled exhaust duct of claim 4, wherein the baffles extend lengthwise substantially parallel to the axial centerline.

6. The cooled exhaust duct of claim 1, wherein the baffles and the bands are substantially orthogonally arranged.

7. The cooled exhaust duct of claim 1, wherein at least of the plurality of baffles includes a stiffening feature.

8. The cooled exhaust duct of claim 1, further comprising one or more joints in at least one of the plurality of baffles.

9. A cooled exhaust duct having an axial centerline, comprising:
- an interior region disposed between a first wall and a second wall, the interior region extending along the axial centerline, wherein the first wall is disposed radially inside of the second wall;
- a plurality of radially expandable bands, each extending within the interior region and axially spaced apart from one another, wherein the bands are attached to the first wall and to the second wall and are operable to accommodate relative position change between the first wall and second wall, wherein each band includes a first portion attached to the first wall, a second portion attached to the second wall and an intermediate portion connected to the first and second portions; and
- a plurality of baffles extending lengthwise between adjacent radially expandable bands and heightwise between the first wall and the second wall.

10. The cooled exhaust duct of claim 9, wherein the radially expandable bands include slots, and the baffles are disposed within the slots.

11. The cooled exhaust duct of claim 10, wherein the baffles extend lengthwise substantially parallel to the axial centerline.

12. The cooled exhaust duct of claim 9, wherein the baffles and the bands are substantially orthogonally arranged.

\* \* \* \* \*

UNITED STATES PATENT AND TRADEMARK OFFICE
CERTIFICATE OF CORRECTION

PATENT NO. : 7,631,481 B2  Page 1 of 1
APPLICATION NO. : 11/000829
DATED : December 15, 2009
INVENTOR(S) : Curtis C. Cowan et al.

It is certified that error appears in the above-identified patent and that said Letters Patent is hereby corrected as shown below:

Column 4, line 56, please delete "connected to" and insert --that extend between and intersect with--.

Column 4, line 57, before "second", please insert --said--.

Column 4, line 60, please delete "walls." and insert --walls; and--.

Column 4, line 61, in claim 1, please insert --a plurality of baffles extending lengthwise between adjacent radially expandable bands and heightwise between the first wall and the second wall.--.

Column 4, lines 64-67, please delete claim 3, "The cooled exhaust duct of claim 1, further comprising a plurality of baffles extending lengthwise between adjacent radially expandable bands and heightwise between the first wall and the second wall.".

Column 5, line 1, please delete "claim 3" and insert --claim 1--.

Column 5, line 9, after "least", please insert --one--.

Column 6, line 4, before "second", please insert --the--.

Column 6, line 7, before "connected", please insert --flexibly--.

Column 6, line 7, before "second", please insert --the--.

Signed and Sealed this

Twenty-third Day of February, 2010

David J. Kappos
*Director of the United States Patent and Trademark Office*